(12) United States Patent
Thiagarajan et al.

(10) Patent No.: US 12,297,813 B2
(45) Date of Patent: May 13, 2025

(54) MULTISIPHON PASSIVE COOLING SYSTEM WITH LIQUID BRIDGE

(71) Applicant: General Electric Company, Schenectady, NY (US)

(72) Inventors: Naveenan Thiagarajan, Niskayuna, NY (US); Andrew Maxwell Peter, Saratoga Springs, NY (US); Samir Salamah, Niskayuna, NY (US)

(73) Assignee: General Electric Renovables Espana, S.L., Barcelona (ES)

( * ) Notice: Subject to any disclaimer, the term of this patent is extended or adjusted under 35 U.S.C. 154(b) by 44 days.

(21) Appl. No.: 18/009,088

(22) PCT Filed: Jun. 10, 2020

(86) PCT No.: PCT/US2020/036905
§ 371 (c)(1),
(2) Date: Dec. 8, 2022

(87) PCT Pub. No.: WO2021/251957
PCT Pub. Date: Dec. 16, 2021

(65) Prior Publication Data
US 2023/0313782 A1    Oct. 5, 2023

(51) Int. Cl.
*F03D 80/60* (2016.01)
(52) U.S. Cl.
CPC ........ *F03D 80/60* (2016.05); *F05B 2260/221* (2013.01)
(58) Field of Classification Search
CPC ..................................................... F03D 80/60
See application file for complete search history.

(56) References Cited

U.S. PATENT DOCUMENTS

| | | | |
|---|---|---|---|
| 4,178,774 | A | 12/1979 | Almen |
| 7,967,550 | B2 | 6/2011 | Grevsen et al. |
| 8,082,748 | B2 | 12/2011 | Matsuo et al. |
| 10,590,916 | B2 | 3/2020 | Waddell et al. |
| 2009/0229291 | A1 | 9/2009 | Winn |

(Continued)

FOREIGN PATENT DOCUMENTS

| CN | 209855975 U | 12/2019 |
|---|---|---|
| EP | 2208888 A3 | 2/2012 |

(Continued)

OTHER PUBLICATIONS

PCT International Search Report & Opinion Corresponding to PCT/US2020/036905 on Jun. 10, 2020.

(Continued)

*Primary Examiner* — Brian O Peters
(74) *Attorney, Agent, or Firm* — Dority & Manning, P.A.

(57) ABSTRACT

A multisiphon passive cooling system includes a heat exchanger thermally connected to a heat-generating component located within an enclosure, a distribution manifold located below the heat exchanger, a condensing unit located external to the enclosure and above the heat exchanger, and a first conduit thermally connected to the heat exchanger. The first conduit is fluidly connected to the distribution manifold and the condensing unit. The cooling system also includes a second conduit fluidly connected to the condensing unit and the distribution manifold, a liquid bridge fluidly connected to the first conduit and the second conduit or the distribution manifold, and a two-phase cooling medium that circulates through a loop defined by the first conduit, the liquid bridge, the condensing unit, the second conduit, the heat exchanger, and the distribution manifold. As such, the liquid bridge transfers the cooling medium in a liquid state from the first conduit to the second conduit or the distribution manifold.

18 Claims, 8 Drawing Sheets

(56) References Cited

U.S. PATENT DOCUMENTS

| 2010/0143126 A1 | 6/2010 | Wan |
| 2012/0235419 A1 | 9/2012 | Huang et al. |
| 2013/0202421 A1 | 8/2013 | Himmelmann |
| 2014/0117794 A1 | 5/2014 | Zirin et al. |
| 2015/0059342 A1 | 3/2015 | Kruger et al. |
| 2016/0128231 A1 | 5/2016 | Wagoner et al. |
| 2017/0177041 A1 | 6/2017 | Shelnutt et al. |
| 2019/0373776 A1 | 12/2019 | Gao |

FOREIGN PATENT DOCUMENTS

| EP | 3517777 A1 | 7/2019 |
| JP | 2005-090852 A | 4/2005 |
| JP | 2014-074568 A | 4/2014 |
| WO | WO2008102184 A2 | 8/2008 |

OTHER PUBLICATIONS

Chang et al., Two-Phase Closed-Loop Thermosyphon for Electronic Cooling, Experimental Heat Transfer, vol. 23, Issue 2, Mar. 18, 2010, pp. 144-156. (Abstract Only) https://www.tandfonline.com/doi/abs/10.1080/08916150903402807.

Stautner et al., Large Scale Superconducting Wind Turbine Cooling, IEEE Transactions on Applied Superconductivity, vol. 23, Issue 3, Jun. 2013, 3 Pages. (Abstract Only) https://ieeexplore.ieee.org/abstract/document/6365243.

Wang et al., Experimental Study on Thermosyphon Heat Sink for Cooling of Electronic Apparatus, Journal of Electron Devices, College of Mechanic and Energy Engineering, China, 1 Page. (Abstract Only) http://en.enki.com.cn/Article_en/CJEDTOTAL-DZQJ200403004.htm.

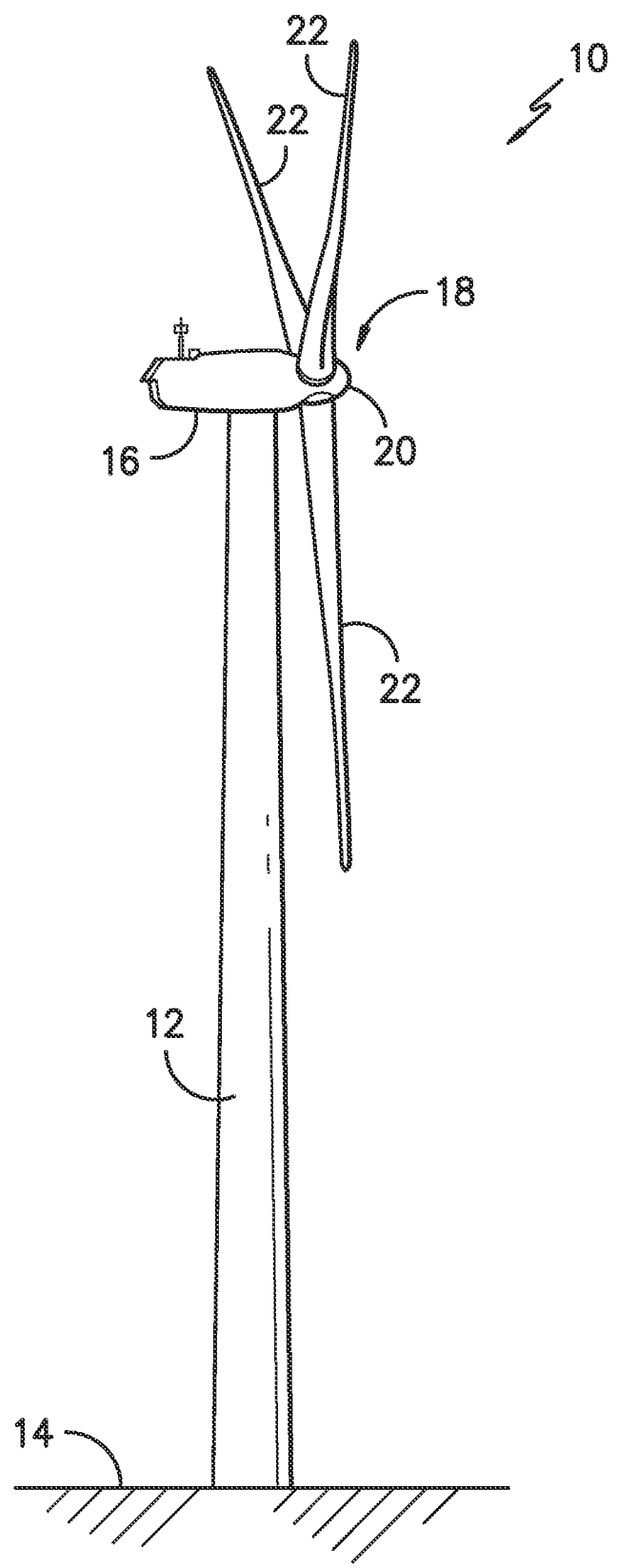
FIG. -1-

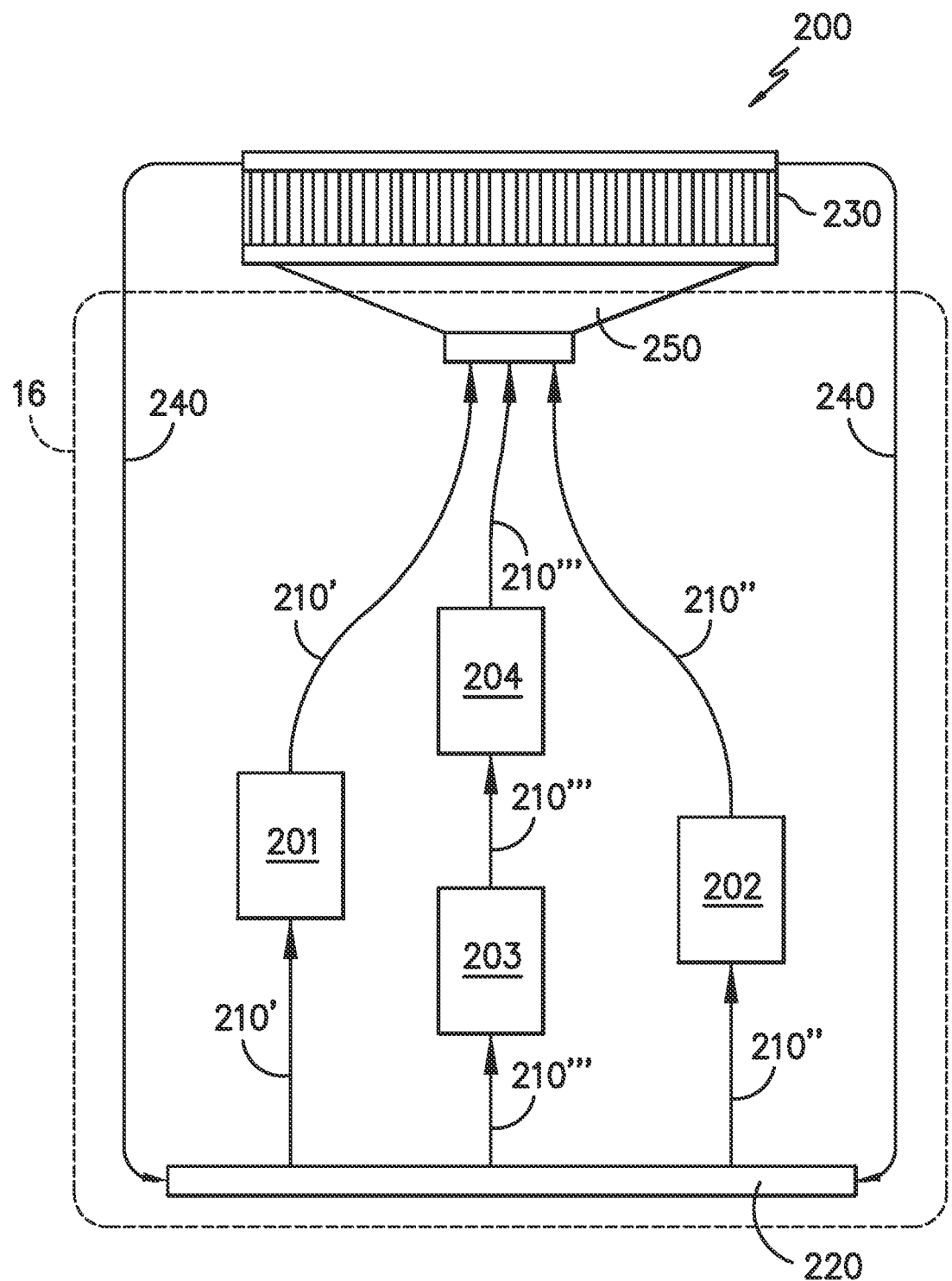
FIG. -2-

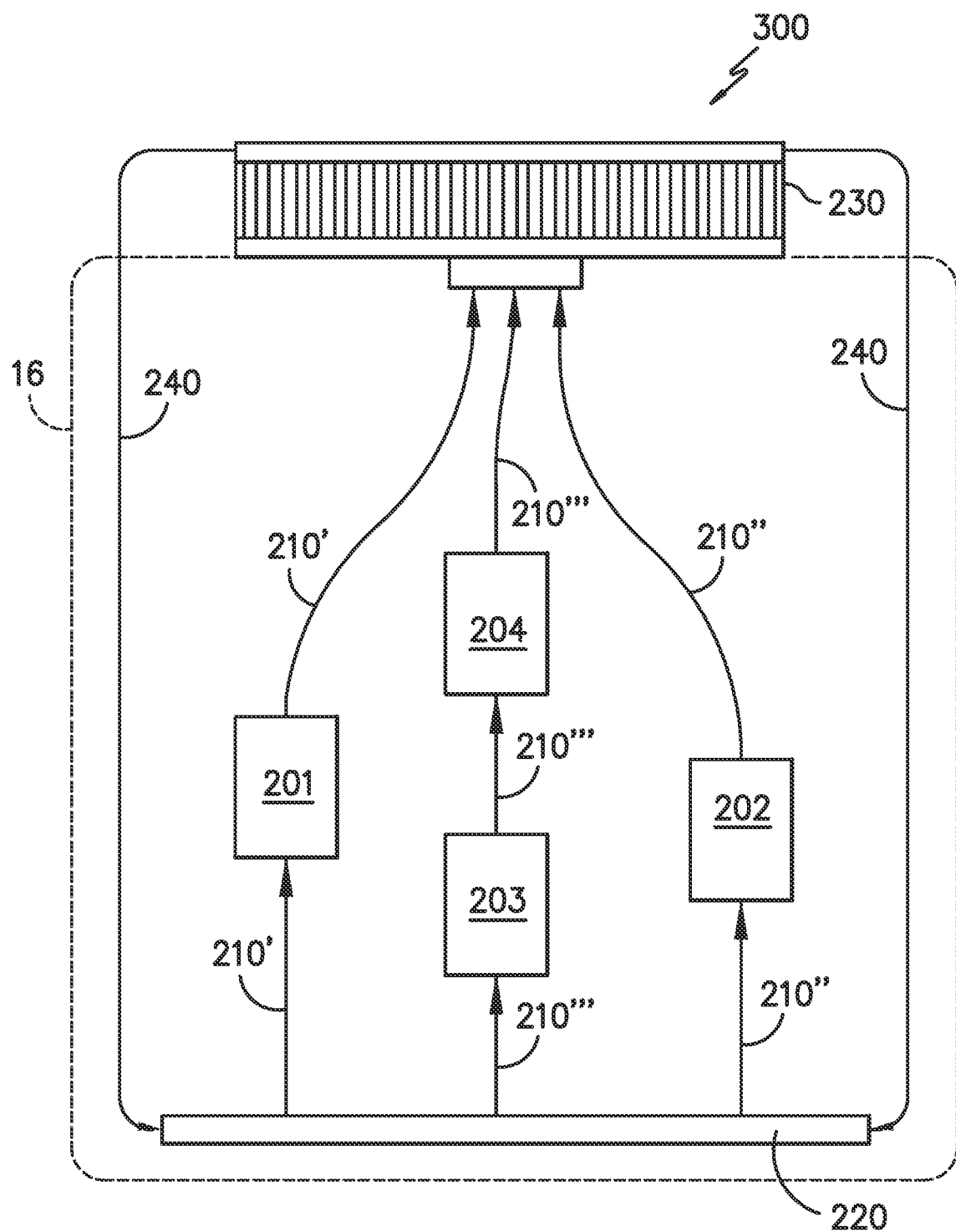
FIG. -3-

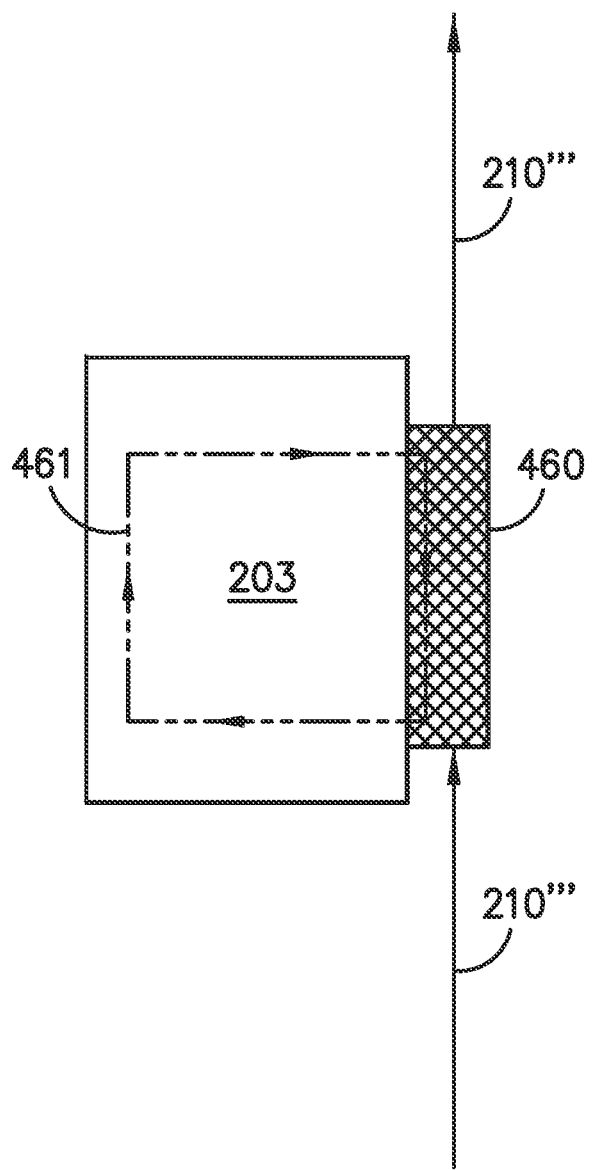
FIG. -4-

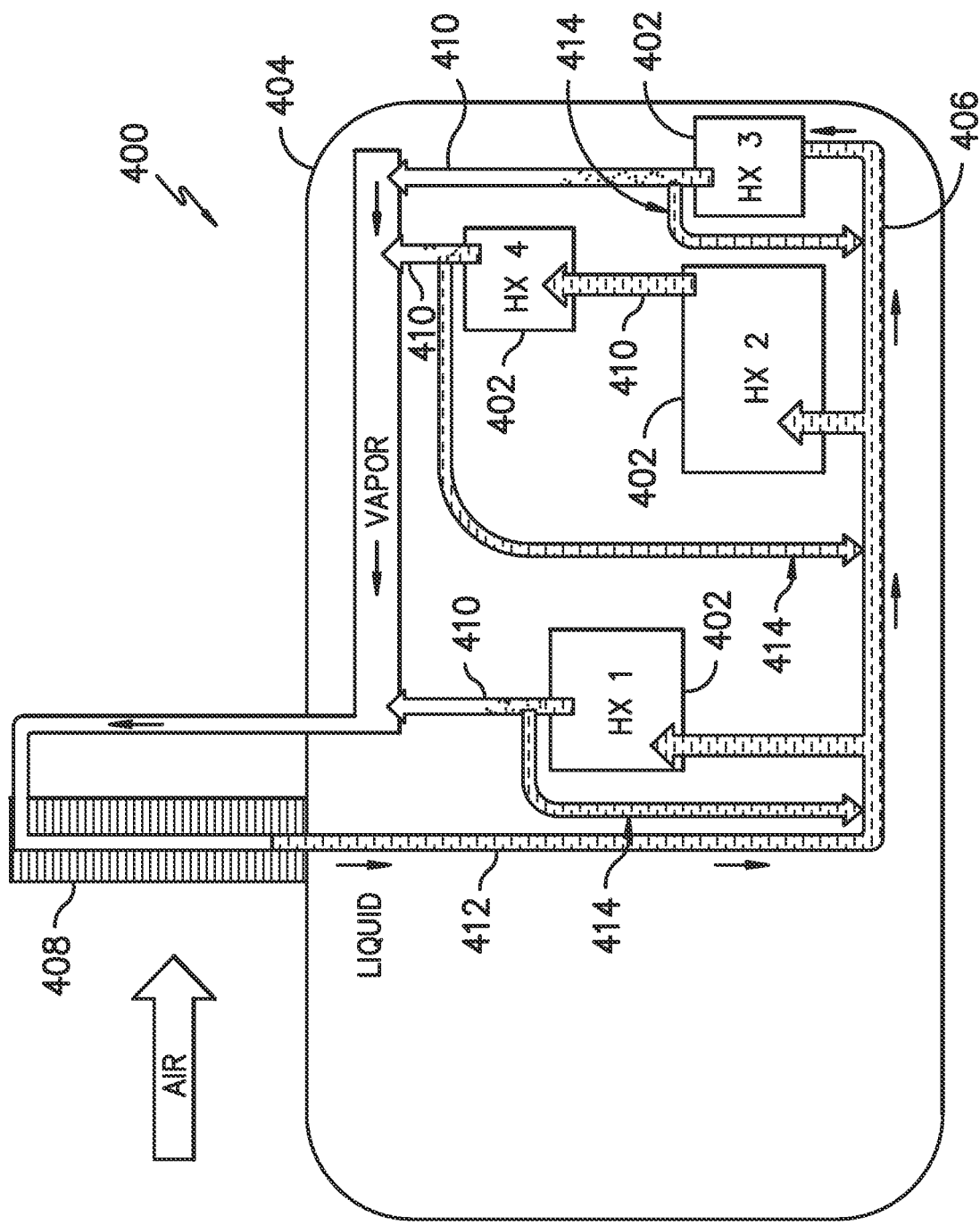
FIG. -5-

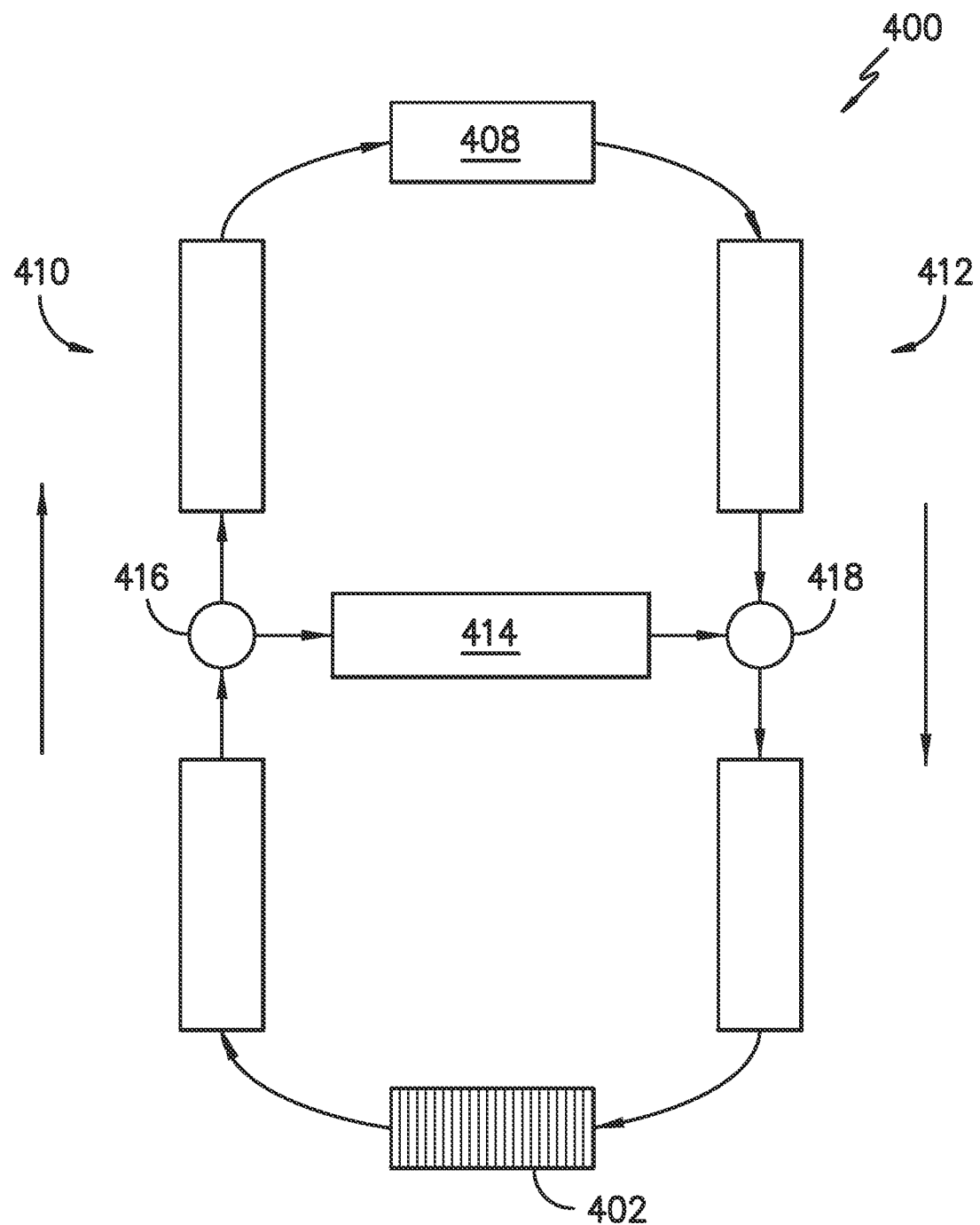
FIG. -6-

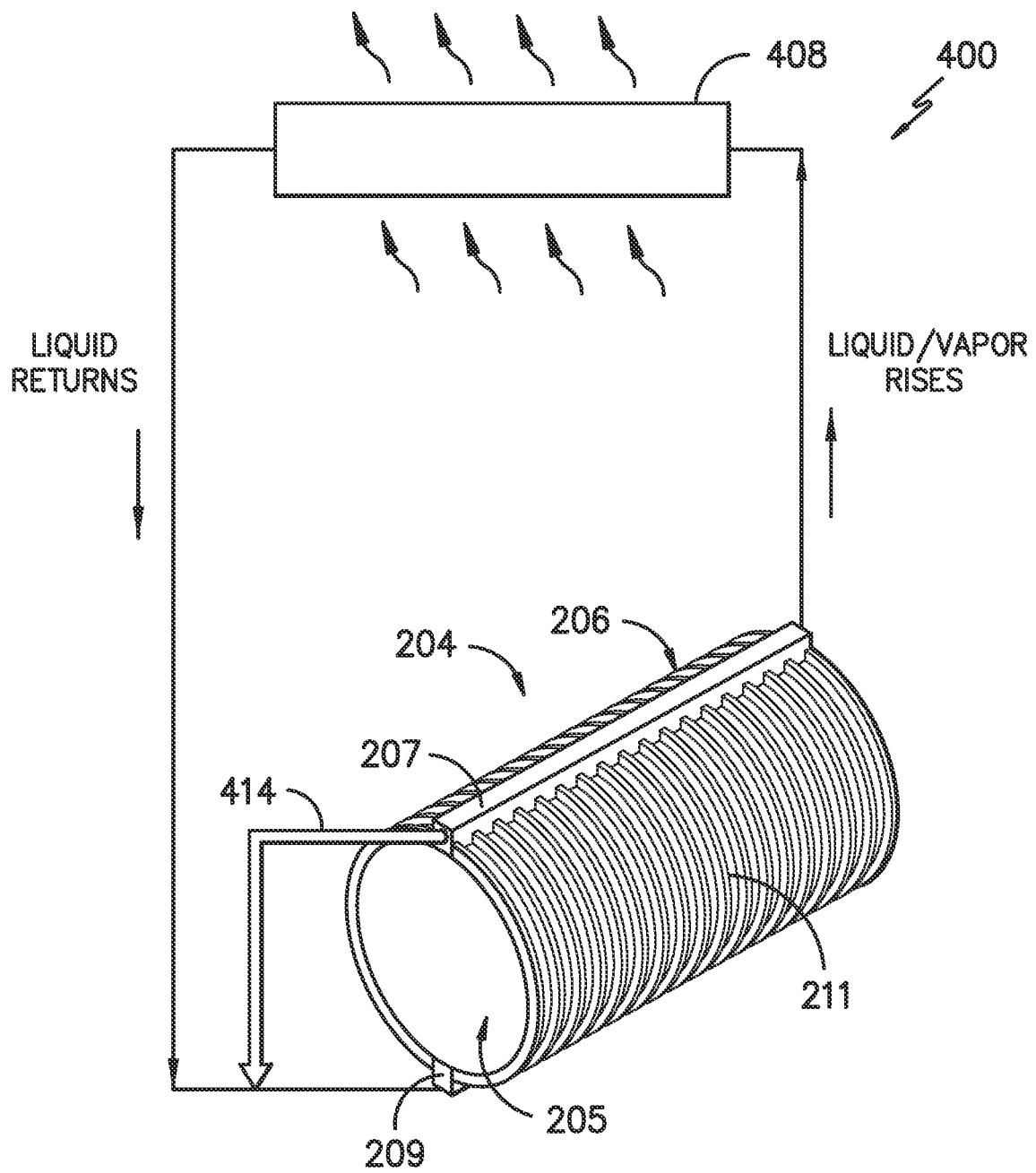
FIG. -7-

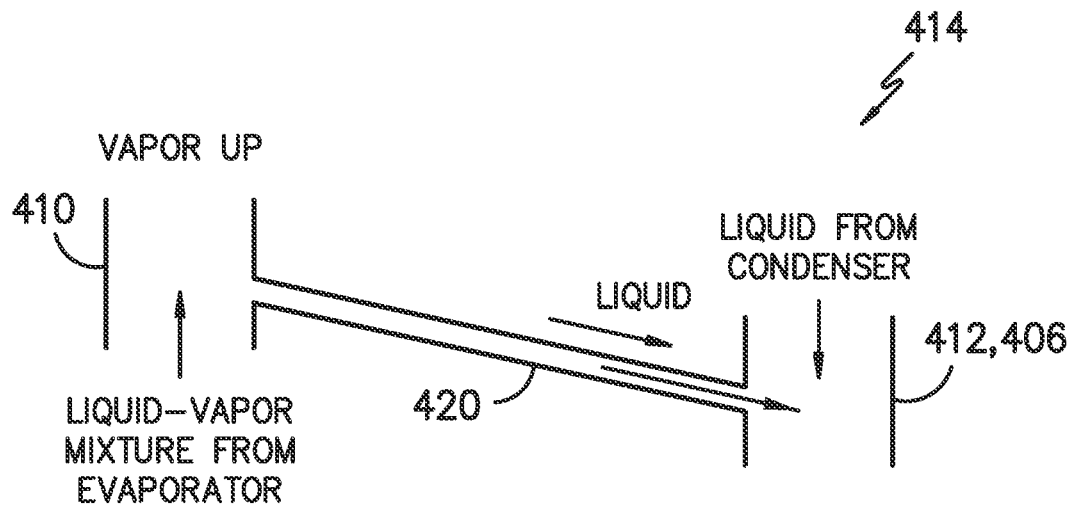
FIG. -8-
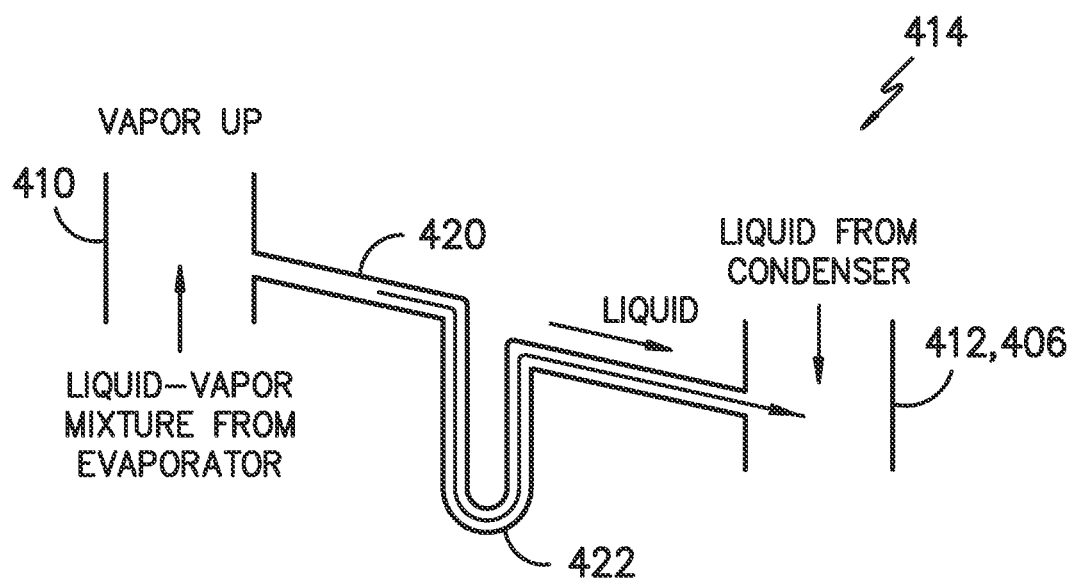
FIG. -9-

MULTISIPHON PASSIVE COOLING SYSTEM WITH LIQUID BRIDGE

RELATED APPLICATIONS

The present application claims priority to PCT Application Serial Number PCT/US2020/036905, filed on Jun. 10, 2020, which is incorporated by reference herein.

FIELD

The present disclosure relates in general to wind turbines, and more particularly to a multisiphon passive cooling system for a wind turbine.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Many known devices (e.g., generators, rectifiers, inverters and transformers) are used for conversion of electric power. Rectifiers are used for converting alternating current (AC) to direct current (DC) and inverters are used for converting DC current to AC current. Typically, rectifiers and inverters are integrated into full power conversion assemblies (i.e., power converters) used in renewable electric power generation facilities such as solar power generation farms and wind turbine farms. These devices typically generate large amounts of heat during power generation. At least some known power generating devices use a liquid cooling system for cooling the main heat-generating components. These liquid cooling systems include an active pump for pumping a working liquid for cooling the power devices, and these systems may also include fans and valves. In such a system, maintaining a flow rate of the working liquid in two or more branches of the liquid cooling system may be problematic due to high resistance to a flow of the working liquid in some branches in comparison to low resistance to the flow of the working liquid in other branches.

A liquid cooling system employing pumps, fans and/or valves is classified as an active system. The term 'active' referring to the mechanical action performed by the pump to circulate the liquid cooling medium, or the forced airflow by the fan. All active systems require periodic maintenance, and this is critical for system reliability. For example, if a pump fails then the entire cooling system will fail to satisfactorily cool the heat-generating components. This is especially problematic for off-shore wind turbines that have limited opportunities for access and maintenance.

BRIEF DESCRIPTION

Aspects and advantages of the invention will be set forth in part in the following description, or may be obvious from the description, or may be learned through practice of the invention.

In one aspect, the present disclosure is directed to a passive cooling system. The passive cooling system includes a heat exchanger thermally coupled to a heat-generating component located within an enclosure, a distribution manifold located below the heat exchanger, a condensing unit located external to the enclosure and above the heat exchanger, and a first conduit thermally connected to the heat exchanger. The first conduit is fluidly connected to the distribution manifold and the condensing unit. The cooling system also includes a second conduit fluidly connected to the condensing unit and the distribution manifold, a liquid bridge fluidly connected to the first conduit and the second conduit or the distribution manifold, and a two-phase cooling medium that circulates through a loop defined by the first conduit, the liquid bridge, the condensing unit, the second conduit, the heat exchanger, and the distribution manifold. As such, the liquid bridge transfers the cooling medium in a liquid state from the first conduit to the second conduit or the distribution manifold.

In an embodiment, the cooling system may include a plurality of heat exchangers thermally connected to a plurality of heat-generating components and a plurality of first conduits connected in parallel between the distribution manifold and the condensing unit. In such embodiments, each of the plurality of first conduits may be fluidly connected with one of the plurality of heat exchangers. In another embodiment, the cooling system may include two or more heat exchangers connected in series along one of the first conduits.

In further embodiments, the cooling system may also include a plurality of liquid bridges fluidly connected to the plurality of first conduits and the second conduit or the distribution manifold.

In additional embodiments, one of the plurality of liquid bridges may be fluidly connected to each of the plurality of first conduits and the second conduit or the distribution manifold.

In certain embodiments, the liquid bridge may be a tubular member positioned at an inclined angle between the first conduit and the second conduit or the distribution manifold. In alternative embodiments, the tubular member may include at least one trap.

In an embodiment, the enclosure may include a nacelle of a wind turbine or a solar power system. In such embodiments, the condensing unit may be secured atop the nacelle. In another embodiment, the heat-generating component(s) may include a generator rotor, a generator stator, a gearbox, a transformer, an inverter, a converter, or combinations thereof. In still further embodiments, the cooling system may be absent of a pump or fan within the enclosure.

In another aspect, the present disclosure is directed to a wind turbine. The wind turbines includes a tower, a nacelle mounted atop the tower and defining an enclosed internal volume, a rotor mounted to the nacelle and having a rotatable hub and at least one rotor blade mounted thereto, at least one heat-generating component positioned within the internal volume of the nacelle, and a passive cooling system for cooling the internal volume of the nacelle. The cooling system includes a heat exchanger thermally coupled to the at least one heat-generating component, a distribution manifold located below the heat exchanger, a condensing unit located external to the nacelle and above the heat exchanger, a first conduit fluidly connected to the heat exchanger, the distribution manifold, and the condensing unit, a second conduit fluidly connected to the condensing unit and the distribution manifold, a liquid bridge fluidly connected to the first conduit and the second conduit or the distribution manifold, and a two-phase cooling medium that circulates through a loop defined by the first conduit, the liquid bridge, the condensing unit, the second conduit, the heat exchanger, and the distribution manifold. Thus, the liquid bridge transfers the cooling medium in a liquid state from the first conduit to the second conduit or the distribution manifold. It should be further understood that the wind turbine may also include any of the additional features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine according to the present disclosure;

FIG. 2 illustrates a schematic view of one embodiment of a cooling system according to the present disclosure;

FIG. 3 illustrates a schematic view of another embodiment of a cooling system according to the present disclosure;

FIG. 4 illustrates a schematic view of the first conduit and a heat exchanger thermally connected to heat generating component according to the present disclosure;

FIG. 5 illustrates a schematic view of yet another embodiment of a passive cooling system according to the present disclosure, particularly illustrating a liquid bridge fluidly connected to the first conduit and the distribution manifold;

FIG. 6 illustrates a schematic view of one embodiment of a liquid bridge of a passive cooling system according to the present disclosure;

FIG. 7 illustrates a schematic view of an embodiment of a cooling system liquid bridge of a passive cooling system according to the present disclosure;

FIG. 8 illustrates a schematic view of another embodiment of a liquid bridge of a passive cooling system according to the present disclosure; and FIG. 9 illustrates a schematic view of still another embodiment of a passive cooling system according to the present disclosure, particularly illustrating a plurality of liquid bridges fluidly connected to a plurality of the first conduits and the distribution manifold.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present disclosure is directed to a multi-siphon cooling system having at least one liquid bridge for cooling heat-generating components. The cooling system described herein may be particularly suitable for a wind turbine. Though, it should be understood that the cooling system may also be suitable in additional applications, including but not limited to solar, hydro, energy storage, and the like or combinations thereof.

Generally, a thermosiphon generally refers to is a passive single-phase or a two-phase cooling system where heat is dissipated from an electrical machine or electronic component by phase change from liquid to vapor (e.g. boiling). The liquid-vapor mixture rises up passively due to buoyancy, to a condenser where the mixture is returned to liquid form and flows down to a heat-generating component again due to gravity. This cycle continues to passively remove heat from the component. In the present disclosure, this concept is extended to multiple heat-generating components, each having a heat exchanger associated therewith, that are connected in a parallel/series configuration to form a passive, high heat transfer cooling system (referred to as a multisiphon). In an embodiment, the cooling system may be completely passive and thus may not require a pump or fan to circulate a cooling fluid therethrough e.g. within the enclosure. Thus, by providing a multisiphon system to a wind turbine machine head, pumps and/or blowers may be eliminated, and heat exchanger sizes may be reduced, thereby lowering the overall volume and weight of the machine head. Moreover, additional power is not required to circulate the cooling fluid. In this manner, the cooling system described herein is reliable and requires little, if any, maintenance.

Aspects discussed herein disclose a cooling and heat dissipation system having a thermosiphon including one or more cooling loops, where each cooling loop includes at least one heat exchanger thermally coupled with a heat-generating component. Such a cooling system may be used for thermal management of a power converter, an inverter, a transformer, a gearbox, or a generator, e.g. of a wind turbine, solar power system, etc. Additionally, the cooling and heat dissipation system may be used for thermal management of a hermetically sealed motor (e.g., a pitch or yaw drive) or the like. The cooling system includes a first conduit, a condensing unit, a second conduit, a distribution manifold, and at least one liquid bridge all connected into a loop. The liquid bridge refers to a fluid connection between the rising liquid-vapor column (riser) from the evaporator and the descending liquid condensate column (downcomer). Thus, the liquid bridge serves to separate the liquid from the rising liquid-vapor mixture and returns this liquid to the inlet side. The liquid bridge also lowers pressure drop in the system by providing parallel pathways for the fluid. The liquid bridge can be a single plain tube inclined at an angle and connecting the riser and down-comer or multiple bridges at least one per heat source (e.g. an evaporator). The bridge could also be enhanced with one or more traps, such as a P-trap, to improve liquid-vapor separation. In addition, the liquid bridge of the present disclosure may also reduce the total coolant mass flow rate flowing through the evaporator, and thus reduce the evaporator thermal duty, thereby reducing its size and/or cost.

The condenser is disposed above the first and second conduits and heat exchangers associated with the heat-generating components. It should be noted herein that the term "above" as used herein means the condenser is physically located at a higher location with respect to the first conduit and the heat-generating components. Thus, the condensing unit is used to receive a two-phase fluid from the first conduit and dissipate the extracted heat to an ambient atmosphere to produce a single-phase fluid. It should be noted herein that the term "single-phase fluid" refers to a liquid medium. Similarly, the term "two-phase fluid" may refer to a mixture of liquid and gaseous mediums, or a gaseous medium.

Referring now to the drawings, FIG. 1 illustrates a side view of a wind turbine 10. As shown, the wind turbine 10 generally includes a tower 12 extending from a support surface 14 (e.g., the ground, a concrete pad, offshore platform or any other suitable support surface). In addition, the wind turbine 10 may also include a nacelle 16 mounted on the tower 12 and a rotor 18 coupled to the nacelle 16. The rotor 18 includes a rotatable hub 20 and at least one rotor blade 22 coupled to and extending outwardly from the hub 20. For example, the rotor 18 may include three rotor blades 22 (as shown). However, the rotor 18 may include more or less than three rotor blades 22. Each rotor blade 22 is spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

Referring now to FIG. 2, a schematic view of one embodiment of a passive cooling system 200 according to the present disclosure is illustrated. Various components within the nacelle (or enclosure) 16 of the wind turbine need to be cooled. For example, such heat-generating components may include a transformer 201, a converter 202, a gearbox 203, or a generator 204 (including both the generator rotor and/or the generator stator). The specific components shown in FIG. 2 are one example only, and nacelles may omit certain heat-generating components or add others. For example, a direct drive wind turbine does not have a gearbox as the rotor is connected directly to the generator, so the gearbox would be omitted in this embodiment. As shown in FIG. 2, all the heat-generating components 201-204 are located or housed within the enclosure 16.

Each heat-generating component 201-204 is thermally connected to a first conduit 210', 210'', 210''', and the first conduit is fluidly connected to a distribution manifold 220 and a condensing unit 230 which is located external to enclosure 16 and above the heat-generating components 201-204. A second conduit 240 is fluidly connected to the condensing unit 230 and the distribution manifold 220. One or more of the conduits 210, 240 contain a two-phase cooling medium that turns gaseous and rises as it heats up by absorbing thermal energy from the heat-generating components 201-204, and the cooling medium changes back to a liquid state as it cools in the condensing unit 230.

A first loop exists with first conduit 210', transformer 201, condensing unit 230, second conduit 240 and distribution manifold 220. A second loop exists with the first conduit 210'', the converter 202, the condensing unit 230, the second conduit 240 and the distribution manifold 220. A third loop exists with first conduit 210''', gearbox 203, generator 204, condensing unit 230, second conduit 240 and distribution manifold 220. The multiple first conduits 210', 210'', 210''' form parallel flow paths between the distribution manifold and the condensing unit. Individual paths may have heat-generating components connected in series, as shown with first conduit 210''' and the gearbox 203 and the generator 204. The cooling medium is in its liquid state in the distribution manifold 220, and the distribution manifold 220 is the lowest element in the system as gravity is used to collect and return the liquid cooling medium to the distribution manifold 220. Liquid cooling medium is also present in the lower portions of the first conduits 210', 210'', 210'''. As the wind turbine 10 operates, the heat-generating components 201-204 generate heat that is transferred to the cooling medium. The cooling medium will phase change to a gaseous state and naturally forms a thermosiphon as the gases rise up first conduits 210', 210'', 210''' towards condensing unit 230.

As mentioned, the condensing unit 230 is located external to the enclosure 16 (or nacelle) and is exposed to natural convective cooling by the wind. In some embodiments, the condensing unit 230 may also include a fan outside of the nacelle 16 to enhance the heat transfer between the two-phase fluid or gas to the ambient air. Such a system may be useful in cases where the wind speed is insufficient to remove all the heat from the heat generating components present inside the nacelle. The gaseous cooling medium in the condensing unit 230 cools down and phase changes back to its liquid state, which is denser than the gaseous state. This liquid cooling medium flows through the second conduit 240 towards the distribution manifold 220. The natural forces of convection are the driving force of circulation for the cooling medium. Hot vapor rises up to the condensing unit 230, and cooler liquid flows to the distribution manifold 220 via the second conduits 240. Accordingly, the cooling system 200 does not require the use of pumps or fans to circulate the cooling medium throughout the system 200, i.e. within the nacelle 16. Hotter components also self-regulate the flow rate of cooling medium passing through the first conduit 210', 210'', 210'''.

Still referring to FIG. 2, the cooling system 200 may also include a vapor spreader 250 interposed between and fluidly connected to the first conduits 210', 210'', 210''' and the condensing unit 230. In certain embodiments, the vapor spreader 250 may be a diffuser that enables the gaseous cooling medium to expand and efficiently fill the condensing unit 230. Further, in an embodiment, the vapor spreader 250 may also reduce the pressure of the vapor and reduce its condensing temperature. Moreover, the vapor spreader 250 may be housed within the enclosure 16, housed partly within and external to the enclosure 16, or entirely external to the enclosure. In another embodiment, the vapor spreader 250 may be attached to the enclosure/nacelle 16 (as shown in FIG. 2) or the condensing unit 230 may be attached to the enclosure/nacelle 16.

The two-phase cooling medium described herein may have a boiling point of about 60° C. or lower at typical operating pressures of, as a non-limiting example, about 6 bar or lower. Further, the temperature range of the boiling point may be chosen to sufficiently cool electronic components (e.g., transformers, converters, etc.), and prevent them from overheating. Coolants with higher boiling points (e.g., water with a boiling point of 100° C.) get too hot before they phase change to a gas and result in over-temperature situations for electronic components. Therefore, examples of satisfactory cooling mediums may include dodecafluoro-2-methylpentan-3-one (e.g., 3M™ Novec™ 649, trademarks of 3M), Novec™ 7000, R245fa, R1233zd(e), or a fluid with a chemical composition of CF3CF2C(O)CF(CF3)2. Other less environmentally friendly alternatives could be 1,1,1,2-tetrafluoroethane, R-134a, 2,3,3,3-Tetrafluoropropene, or HFO-1234yf, however, these may not exist in a liquid state for the desired time period or in the desired temperature range.

Referring now to FIG. 3, a schematic view of another embodiment of a cooling system 300 according to the present disclosure is illustrated. As shown, the condensing unit 230 is attached to the enclosure or nacelle 16 and the vapor spreader (as shown in FIG. 2) is omitted. Further, as shown, the first conduits 210', 210", 210''' fluidly connect directly to the condensing unit 230. An advantage of this embodiment (and the embodiment shown in FIG. 2) is that the nacelle 16 may be sealed. External vents allowing air into the nacelle 16 are not required, which may be an advantage in sandy, dusty or salt-water environments. Moreover, a sealed nacelle may reduce or eliminate contaminants from entering the interior of the nacelle, and this is advantageous to the various components (i.e., the generator rotor, the generator stator, transformer, converter, etc.) housed therein. Another advantage to the cooling systems 200, 300 described herein may be that the condensing unit 230 need only be higher than the upper portion of first conduits 210', 210", 210''' to enable natural convective flow. This enables the condensing unit 230 to be attached directly to the top of the nacelle 16. In other words, large or substantial height differentials between the condensing unit 230 and the heat-generating components 201-204 are not required for the system to function properly. It can be very problematic to permanently elevate (e.g., on top of a pole) the condensing unit 230 due to the substantial wind loads sustained at elevations above the nacelle 16. Therefore, the condensing unit 230 is more stable, secure and reliable when attached either directly to the nacelle or to the nacelle via vapor spreader 250. Further, orienting the condensing unit 230 normal to the wind flow removes the need for an electric fan. When the wind is blowing at a reduced rate, the associated heat load to dissipate will also be reduced.

Referring now to FIG. 4, a schematic view of the first conduit 210'''' and a heat exchanger 460 thermally connected to heat-generating component 203 according to the present disclosure is illustrated. As shown, the heat exchanger 460 may be a loop or spiral of first conduit 210''' in thermal connection with component 203, or the heat exchanger may include separate cooling loop that circulate heat transfer mediums. For example, heat exchanger 460 may include a heat transfer loop 461 that passes in or around the component 203. The loop 461 may be configured in a counter-flow arrangement (as shown) with respect to first conduit 210''', or a cross flow arrangement where heat transfer medium in loop 461 travels generally orthogonal to flow in first conduit 210". The loop 461 and conduit 210''' may also be configured in a parallel-flow arrangement, where both flows travel in the same direction. The heat transfer medium in loop 461 may be air or fluid, which could exchange heat with flow through the first conduits 210', 210", 210''' using a parallel plate heat exchanger where the fluid loop 203 and the fluid in the first conduits 210', 210", 210''' flow through alternating passages in parallel direction or opposed to each other. Other types of heat exchangers may also include, but are not limited to, cross-flow heat exchangers. Heat transfer from component 203 to heat exchanger 460 may also occur through a radiative or conductive effect. For example, a highly heat conductive material (e.g., copper or aluminum) can be attached to the component 203 and the first conduits 210', 210", 210''' may be embedded within or attached to the highly heat conductive material. The highly conductive material connected to the component 203 may also have internal flow conduits or channels that are fluidly connected to the first conduit 210 at the inlet and exit. The internal flow conduits or channels may have extended surfaces to increase surface area that enhance the heat transfer from the heat generating component to the fluid. Additional heat exchangers 460 (and respective first conduits) may be thermally attached to each heat generating component desired to be cooled.

Referring now to FIG. 5, a schematic view of still another embodiment of a passive cooling system 400 according to the present disclosure is illustrated. As shown, the passive cooling system 400 includes one or more heat exchangers 402 associated with one or more heat-generating components located within an enclosure 404, such as, for example, the nacelle 16 of the wind turbine 10. For example, as described herein, in an embodiment, the heat-generating component(s) may include the generator 204 (e.g. the generator rotor or the generator stator), the gearbox 203, the transformer 201, the converter 202 of the wind turbine 10, or any combinations thereof.

Further, as shown, the cooling system 400 includes a distribution manifold 406 located below the heat exchangers 402 and a condensing unit 408 located external to the enclosure 404 and above the heat exchangers 402. Moreover, as shown, the cooling system 400 includes a first conduit 410 fluidly connected to each of the heat exchangers 402. In addition, as shown, the first conduits 410 are fluidly connected to the distribution manifold 406 and the condensing unit 408. For example, as shown, the cooling system 400 may include a plurality of first conduits 410 connected in parallel between the distribution manifold 406 and the condensing unit 408. In such embodiments, as shown, each of the plurality of first conduits 410 may be fluidly connected with one of the plurality of heat exchangers 402. In another embodiment, the cooling system 400 may include two or more heat exchangers 402 connected in series along one of the first conduits 410.

Still referring to FIG. 5, the cooling system 400 also includes a second conduit 412 fluidly connected to the condensing unit 408 and the distribution manifold 406. Further, as shown, the cooling system 400 includes at least one liquid bridge 414 fluidly connected to each of the first conduits 410 and the second conduits 412 or the distribution manifold 406. More specifically, as shown, the cooling system 400 may include a plurality of the liquid bridges 414 fluidly connected to the plurality of first conduits 410 and the second conduit 412 or the distribution manifold 406. In particular embodiments, as shown, one of the plurality of liquid bridges 414 may be fluidly connected to each of the plurality of first conduits 410 and the second conduit 412 or the distribution manifold 406. Accordingly, a two-phase cooling medium (e.g. vapor to liquid) can be circulated through a loop defined by the heat exchangers 402, the first conduits 410, the liquid bridges 414, the condensing unit 408, the second conduit 412, and the distribution manifold 406. As such, the liquid bridges 414 transfer the cooling medium in a liquid state from the first conduits 410 to the second conduit 412 or the distribution manifold 406.

More particularly, as shown in FIG. 6, a detailed, schematic diagram of a portion of the multisiphon cooling system 400 is illustrated, particularly depicting an embodiment of the liquid bridge 414. In the illustrated embodiment, as example, the liquid bridge 414 provides a fluid connection between the rising liquid-vapor column (i.e. first conduit(s) 410) from one of the heat exchangers 402 and the descending liquid condensate column (i.e. the second conduit 412 or the distribution manifold 406). More specifically, as shown, the first conduit(s) 410 may include a splitter 416 for capturing the liquid. For example, in certain embodiments, the splitter 416 may be a cyclonic splitter or a chevron demister. Similarly, the second conduit 412 or the distribution manifold 406 may include a mixer 418 for receiving the captured liquid and mixing said liquid with the descending liquid condensate. As such, the liquid bridge(s) 414 described herein serve to separate liquid from the rising liquid-vapor mixture and return said liquid to the inlet side of the cooling system 400. The liquid bridge(s) 414 described herein also lower pressure drop in the system 400 by providing parallel pathways for the fluid.

Referring now to FIG. 7, a schematic diagram of another embodiment of the cooling system 400 is illustrated. As shown, the heat-generator component of the cooling system 400 may be the stator 205 of the generator 204. More particularly, as shown, the stator 205 includes a thermosiphon jacket 206 that wraps over the outer diameter of the stator. Further, as shown, the jacket 206 may also include one or more channels 211 extending from the bottom to the top of the stator 205 along the outer circumference thereof. More specifically, as shown, the channels are parallel and may be connected at the top and bottom by inlet and outlet manifolds 207, 209. Thus, in such an embodiment, heat from the stator 205 causes the liquid in the jacket 206 to be converted to vapor. Moreover, as shown, the vapor rises up passively to the top of the stator 205 and collects at the manifold 207. The collected vapor rises further up passively due to buoyancy and thermal contacts with cooler air at the condensing unit 408. The vapor condenses back to liquid form, which is then returned back to the inlet manifold 209 to continue the cycle. Though not illustrated in FIG. 7, the cooling system 400 may also include a liquid bridge as described herein, which serves to separate the liquid from vapor at the outlet manifold 207 and return the liquid back to the inlet manifold 209, thereby, by passing the condenser. This provision reduces system pressure drop to improve the thermosiphon mass flow rate and hence the thermal performance of system.

Referring now to FIGS. 8 and 9, various embodiments of the liquid bridge 414 of the passive cooling system 400 described herein is illustrated. In particular, as shown in FIG. 8, the liquid bridge(s) 414 described herein may be a tubular member 420 inclined at an angle (e.g. ranging from 0 to 90 degrees) between the first conduits 410 and the second conduit 412 or the distribution manifold 406. In another embodiment, as shown in FIG. 9, the liquid bridge(s) 414 described herein may also include one or more traps 422, such as a P-trap or running trap, to improve liquid-vapor separation. Thus, in such embodiments, such trap(s) 422 are configured to discourage the flow of vapor through the liquid bridge.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. Such terms as applied to a particular value of a range applies to both values, and unless otherwise dependent on the precision of the instrument measuring the value, may indicate +/10% of the stated value(s).

Various aspects and embodiments of the present invention are defined by the following numbered clauses:

Clause 1. A passive cooling system, comprising:
a heat exchanger thermally connected to a heat-generating component located within an enclosure;
a distribution manifold located below the heat exchanger;
a condensing unit located external to the enclosure and above the heat exchanger;
a first conduit fluidly connected to the heat exchanger, the distribution manifold, and the condensing unit;
a second conduit fluidly connected to the condensing unit and the distribution manifold;
a liquid bridge fluidly connected to the first conduit and the second conduit or the distribution manifold; and,
a two-phase cooling medium that circulates through a loop defined by the first conduit, the liquid bridge, the condensing unit, the second conduit, the heat exchanger, and the distribution manifold,
wherein the liquid bridge transfers the cooling medium in a liquid state from the first conduit to the second conduit or the distribution manifold.

Clause 2. The passive cooling system of clause 1, further comprising a plurality of heat exchangers thermally connected to a plurality of heat-generating components and a plurality of first conduits connected in parallel between the distribution manifold and the condensing unit, wherein each of the plurality of first conduits is fluidly connected with one of the plurality of heat exchangers.

Clause 3. The passive cooling system of clause 2, further comprising two or more heat exchangers connected in series along one of the first conduits.

Clause 4. The passive cooling system of clause 2, further comprising a plurality of liquid bridges fluidly connected to the plurality of first conduits and the second conduit or the distribution manifold.

Clause 5. The passive cooling system of clause 4, wherein one of the plurality of liquid bridges is fluidly connected to each of the plurality of first conduits and the second conduit or the distribution manifold.

Clause 6. The passive cooling system of any of the preceding clauses, wherein the liquid bridge comprises a tubular member positioned at an inclined angle between the first conduit and the second conduit or the distribution manifold.

Clause 7. The passive cooling system of clause 6, wherein the tubular member further comprises at least one trap.

Clause 8. The passive cooling system of any of the preceding clauses, wherein the enclosure comprises a nacelle of a wind turbine or a solar power system.

Clause 9. The passive cooling system of clause 8, wherein the condensing unit is secured atop the nacelle.

Clause 10. The passive cooling system of any of the preceding clauses, wherein the one or more heat-generating components comprise at least one of a generator rotor, a generator stator, a gearbox, a transformer, an inverter, or a converter.

Clause 11. The passive cooling system of any of the preceding clauses, wherein the cooling system is absent of a pump or fan within the enclosure.

Clause 12. A wind turbine, comprising:
a tower;
a nacelle mounted atop the tower, the nacelle defining an enclosed internal volume;
a rotor mounted to the nacelle, the rotor comprising a rotatable hub and at least one rotor blade mounted thereto;

at least one heat-generating component positioned within the internal volume of the nacelle; and,
a passive cooling system for cooling the internal volume of the nacelle, comprising:
a heat exchanger thermally connected to the at least one heat-generating component;
a distribution manifold located below the heat-generating component;
a condensing unit located external to the nacelle and above the heat-generating component;
a first conduit thermally connected to the heat-generating component, the first conduit fluidly connected to the distribution manifold and the condensing unit;
a second conduit fluidly connected to the condensing unit and the distribution manifold;
a liquid bridge fluidly connected to the first conduit and the second conduit or the distribution manifold; and,
a two-phase cooling medium that circulates through a loop defined by the first conduit, the liquid bridge, the condensing unit, the second conduit, the heat exchanger, and the distribution manifold,
wherein the liquid bridge transfers the cooling medium in a liquid state from the first conduit to the second conduit or the distribution manifold.

Clause 13. The wind turbine of clause 12, further comprising a plurality of heat exchangers thermally connected to a plurality of heat-generating components and a plurality of first conduits connected in parallel between the distribution manifold and the condensing unit, wherein each of the plurality of first conduits is fluidly connected with one of the plurality of heat exchangers.

Clause 14. The wind turbine of clause 13, further comprising two or more heat exchangers connected in series along one of the first conduits.

Clause 15. The wind turbine of clause 13, further comprising a plurality of liquid bridges fluidly connected to the plurality of first conduits and the second conduit or the distribution manifold.

Clause 16. The wind turbine of clause 15, wherein one of the plurality of liquid bridges is fluidly connected to each of the plurality of first conduits and the second conduit or the distribution manifold.

Clause 17. The wind turbine of clauses 12-16, wherein the liquid bridge comprises a tubular member positioned at an inclined angle between the first conduit and the second conduit or the distribution manifold.

Clause 18. The wind turbine of clause 18, wherein the tubular member further comprises at least one trap.

Clause 19. The wind turbine of clauses 12-18, wherein the condensing unit is secured atop the nacelle.

Clause 20. The wind turbine of clauses 12-19, wherein the one or more heat-generating components comprise at least one of a generator rotor, a generator stator, a gearbox, a transformer, or a converter of the wind turbine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A passive cooling system, comprising:
a heat exchanger thermally connected to a heat-generating component located within an enclosure;
a distribution manifold located below the heat exchanger;
a condensing unit located external to the enclosure and above the heat exchanger;
a first conduit fluidly connected to the heat exchanger, the distribution manifold, and the condensing unit;
a second conduit fluidly connected to the condensing unit and the distribution manifold;
a liquid bridge fluidly connected to the first conduit and the second conduit or the distribution manifold; and
a two-phase cooling medium that circulates through a loop defined by the first conduit, the liquid bridge, the condensing unit, the second conduit, the heat exchanger, and the distribution manifold,
wherein the liquid bridge transfers the cooling medium in a liquid state from the first conduit to the second conduit or the distribution manifold, and
wherein the liquid bridge comprises a tubular member positioned at an inclined angle between the first conduit and the second conduit or the distribution manifold.

2. The passive cooling system of claim 1, further comprising a plurality of heat exchangers thermally connected to a plurality of heat-generating components and a plurality of first conduits connected in parallel between the distribution manifold and the condensing unit, wherein each of the plurality of first conduits is fluidly connected with one of the plurality of heat exchangers.

3. The passive cooling system of claim 2, further comprising two or more heat exchangers connected in series along one of the first conduits.

4. The passive cooling system of claim 2, further comprising a plurality of liquid bridges fluidly connected to the plurality of first conduits and the second conduit or the distribution manifold.

5. The passive cooling system of claim 4, wherein one of the plurality of liquid bridges is fluidly connected to each of the plurality of first conduits and the second conduit or the distribution manifold.

6. The passive cooling system of claim 1, wherein the tubular member further comprises at least one trap.

7. The passive cooling system of claim 1, wherein the enclosure comprises a nacelle of a wind turbine or a solar power system.

8. The passive cooling system of claim 7, wherein the condensing unit is secured atop the nacelle.

9. The passive cooling system of claim 1, wherein the one or more heat-generating components comprise at least one of a generator rotor, a generator stator, a gearbox, a transformer, an inverter, or a converter.

10. The passive cooling system of claim 1, wherein the cooling system is absent of a pump or fan within the enclosure.

11. A wind turbine, comprising:
a tower;
a nacelle mounted atop the tower, the nacelle defining an enclosed internal volume;
a rotor mounted to the nacelle, the rotor comprising a rotatable hub and at least one rotor blade mounted thereto;
at least one heat-generating component positioned within the internal volume of the nacelle; and,
a passive cooling system for cooling the internal volume of the nacelle, comprising:
a heat exchanger thermally connected to the at least one heat-generating component;

a distribution manifold located below the heat-generating component;

a condensing unit located external to the nacelle and above the heat-generating component;

a first conduit thermally connected to the heat-generating component, the first conduit fluidly connected to the distribution manifold and the condensing unit;

a second conduit fluidly connected to the condensing unit and the distribution manifold;

a liquid bridge fluidly connected to the first conduit and the second conduit or the distribution manifold; and a two-phase cooling medium that circulates through a loop defined by the first conduit, the liquid bridge, the condensing unit, the second conduit, the heat exchanger, and the distribution manifold, wherein the liquid bridge transfers the cooling medium in a liquid state from the first conduit to the second conduit or the distribution manifold, and wherein the liquid bridge comprises a tubular member positioned at an inclined angle between the first conduit and the second conduit or the distribution manifold.

12. The wind turbine of claim 11, further comprising a plurality of heat exchangers thermally connected to a plurality of heat-generating components and a plurality of first conduits connected in parallel between the distribution manifold and the condensing unit, wherein each of the plurality of first conduits is fluidly connected with one of the plurality of heat exchangers.

13. The wind turbine of claim 12, further comprising two or more heat exchangers connected in series along one of the first conduits.

14. The wind turbine of claim 12, further comprising a plurality of liquid bridges fluidly connected to the plurality of first conduits and the second conduit or the distribution manifold.

15. The wind turbine of claim 14, wherein one of the plurality of liquid bridges is fluidly connected to each of the plurality of first conduits and the second conduit or the distribution manifold.

16. The wind turbine of claim 11, wherein the tubular member further comprises at least one trap.

17. The wind turbine of claim 11, wherein the condensing unit is secured atop the nacelle.

18. The wind turbine of claim 11, wherein the one or more heat-generating components comprise at least one of a generator rotor, a generator stator, a gearbox, a transformer, or a converter of the wind turbine.

* * * * *